United States Patent
Toussi

(10) Patent No.: US 7,945,739 B2
(45) Date of Patent: May 17, 2011

(54) STRUCTURE FOR REDUCING COHERENCE ENFORCEMENT BY SELECTIVE DIRECTORY UPDATE ON REPLACEMENT OF UNMODIFIED CACHE BLOCKS IN A DIRECTORY-BASED COHERENT MULTIPROCESSOR

(75) Inventor: Farnaz Toussi, Minneapolis, MN (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 12/046,293

(22) Filed: Mar. 11, 2008

(65) Prior Publication Data

US 2009/0063771 A1    Mar. 5, 2009

Related U.S. Application Data

(63) Continuation-in-part of application No. 11/845,812, filed on Aug. 28, 2007.

(51) Int. Cl.
*G06F 12/00* (2006.01)
(52) U.S. Cl. ........................................................ 711/141
(58) Field of Classification Search .................. None
See application file for complete search history.

(56) References Cited

U.S. PATENT DOCUMENTS 6,338,123 B2 * 1/2002 Joseph et al. .................. 711/144
6,859,864 B2 * 2/2005 Khare et al. ................... 711/146

* cited by examiner

*Primary Examiner* — Hiep T Nguyen
(74) *Attorney, Agent, or Firm* — Patterson & Sheridan, LLP

(57) ABSTRACT

A design structure embodied in a machine readable storage medium for designing, manufacturing, and/or testing a design to reduce the number of memory directory updates during block replacement in a system having a directory-based cache is provided. The design structure may be implemented to utilize a read/write bit to determine the accessibility of a cache line and limit memory directory updates during block replacement to regions that are determined to be readable and writable by multiple processors.

7 Claims, 6 Drawing Sheets

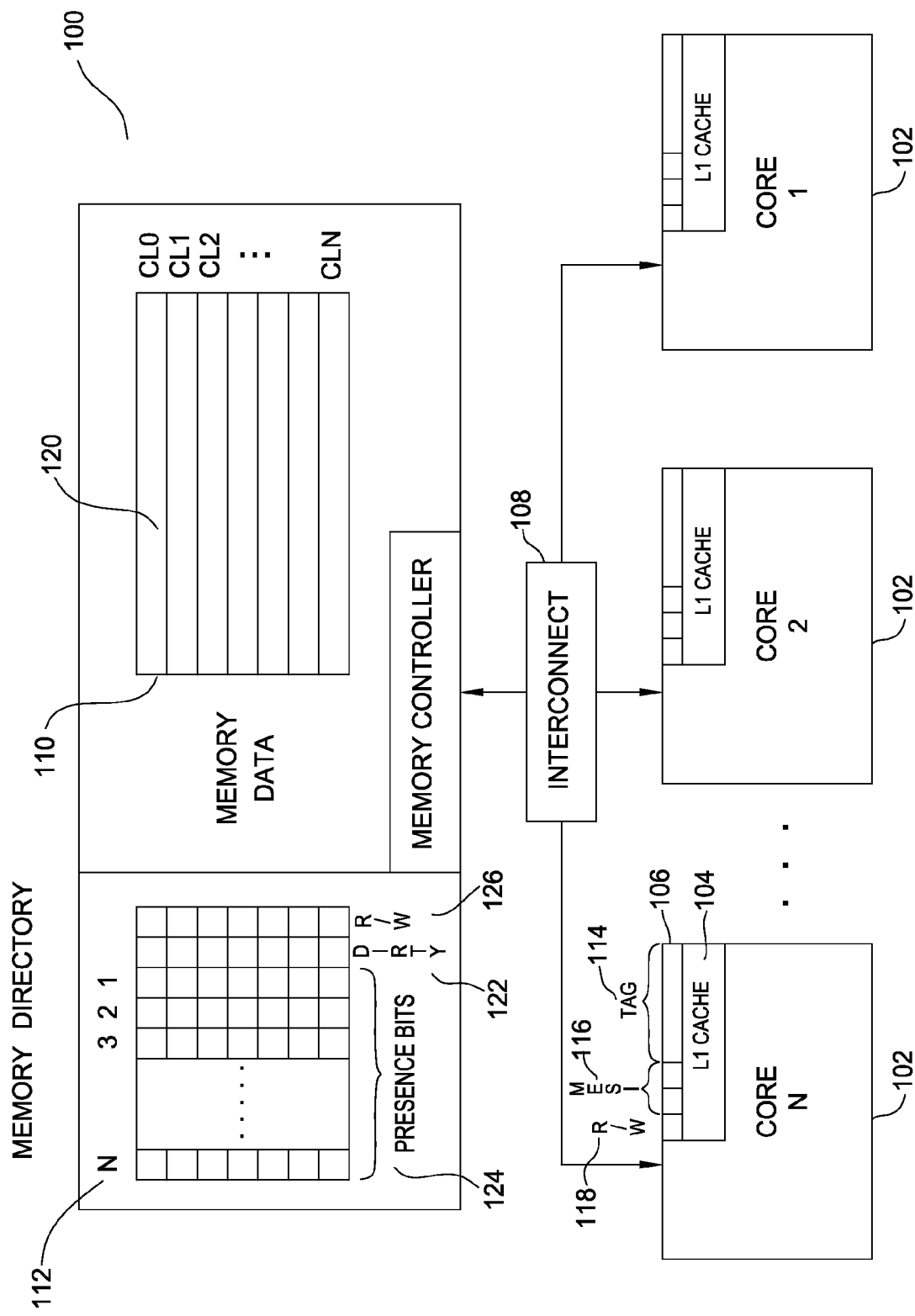

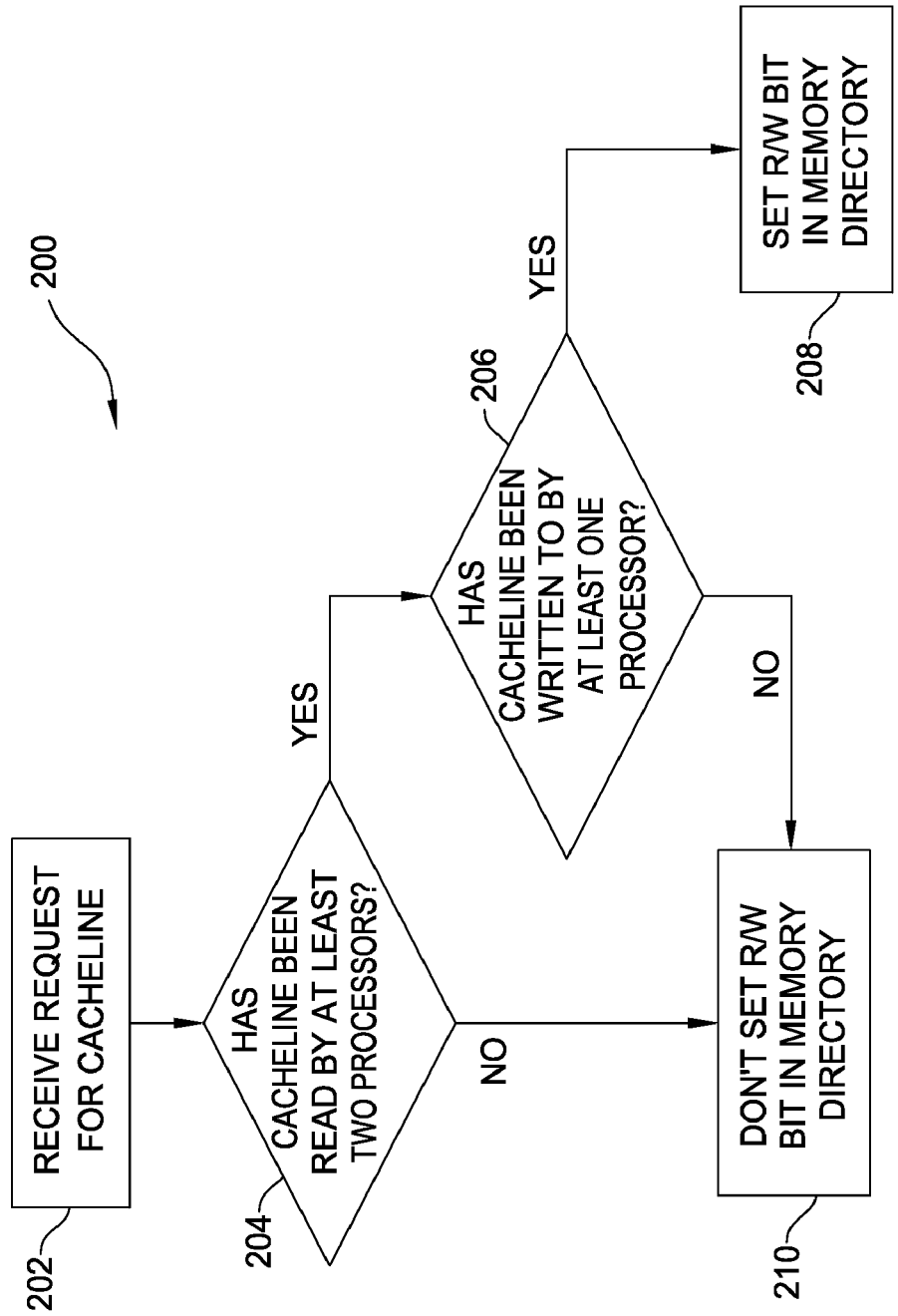

US 7,945,739 B2

STRUCTURE FOR REDUCING COHERENCE ENFORCEMENT BY SELECTIVE DIRECTORY UPDATE ON REPLACEMENT OF UNMODIFIED CACHE BLOCKS IN A DIRECTORY-BASED COHERENT MULTIPROCESSOR

CROSS-REFERENCE TO RELATED APPLICATIONS

This application is a continuation-in-part of co-pending U.S. patent application Ser. No. 11/845,812, filed Aug. 28, 2007, which is herein incorporated by reference.

BACKGROUND OF THE INVENTION

1. Field of the Invention

Embodiments of the present invention generally relate to design structures, and more specifically design structures in the field of computer processing and more specifically relates to a method and apparatus to reduce directory updates to a directory-based cache.

2. Description of the Related Art

In a system containing numerous processors and distributed memory, directory-based cache, coherence schemes are often used to maintain cache coherency between processors.

SUMMARY OF THE INVENTION

One embodiment provides a system including multiple processors, each having their own cache and cache directory, coupled with a memory and memory directory via a system interconnect. The memory directory includes a dirty bit, presence bits (one for each processor in the system) and a read/write bit. The cache directory includes tag bits, state bits and a read/write bit. The read/write bit is set by logic that determines if a cache line has been read by more than one processor and written to by at least one processor. During a block replacement, a processor will only update the presence bits if either the block its replacing is modified, or if the read/write bit associated with that block is set, thus updating the directory when there is a potential coherence enforcement, for example during invalidation requests by other processors. This mechanism will reduce the number of invalidations and directory updates.

Another embodiment provides a design structure embodied in a machine readable storage medium for at least one of designing, manufacturing, and testing a design. The design structure generally comprises a system. The system generally comprises a memory having a plurality of memory blocks, a memory directory having a read/write bit associated with each of the plurality of memory blocks and logic configured to set the read/write bit when the memory block associated with the read/write bit has been read by more than one processor and written by at least one other processor and presence bits to indicate processors have or have had a copy of an associated memory block, and at least two processors, each having a cache to store a plurality of memory blocks from the memory as cache lines and logic configured to update presence bits in the memory directory when replacing an unmodified cache line corresponding to a memory block only when the associated read/write bit is set.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is illustrates one embodiment of a system with a directory-based cache.

FIG. 2 is a flow diagram of example operations for setting a read/write bit in the directory-based cache

DETAILED DESCRIPTION OF THE PREFERRED EMBODIMENT

Figure 3A:
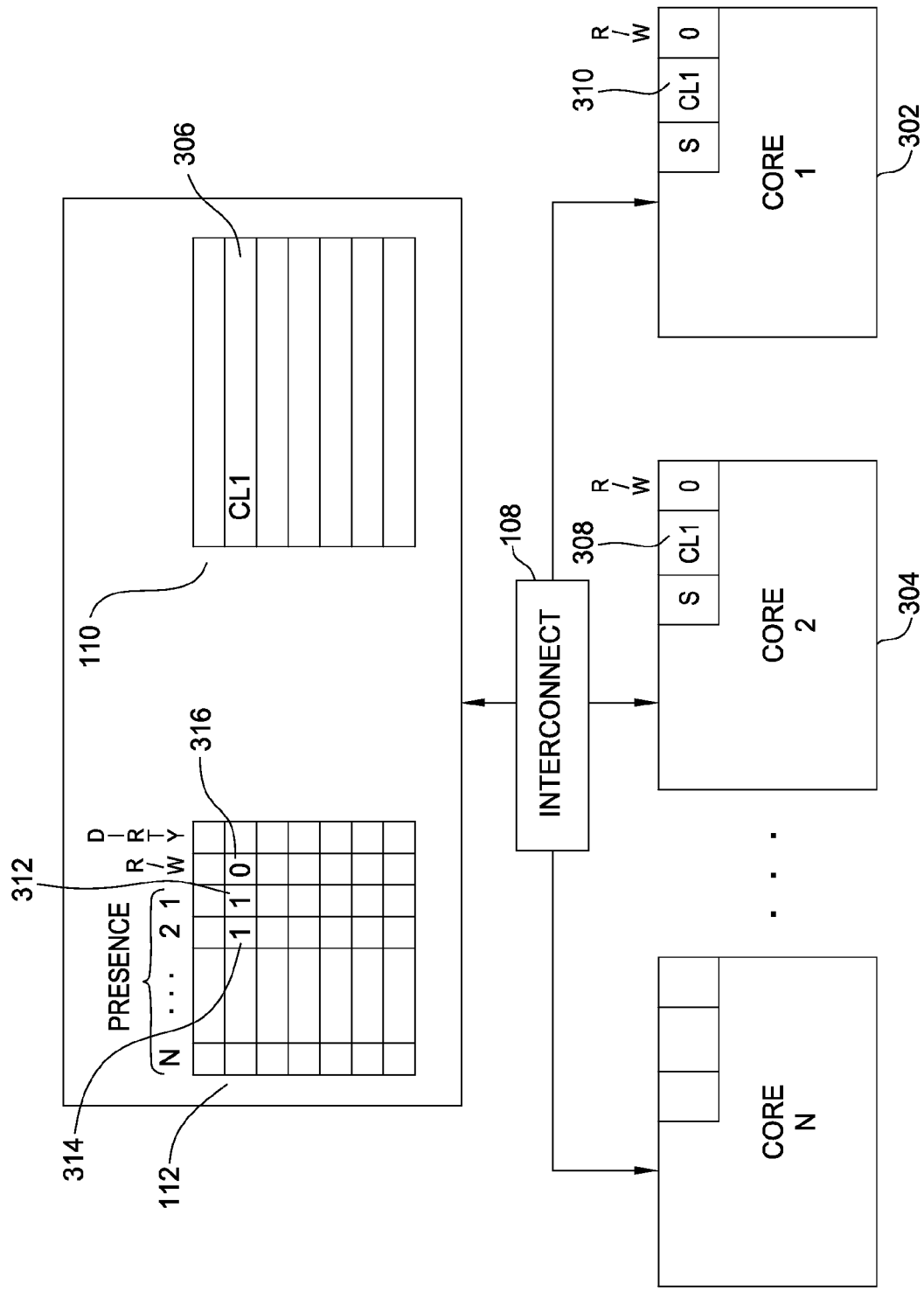
FIGS. 3A and 3B illustrate updating the read/write bit in the directory-based cache system.

Embodiments of the invention generally provide techniques that reduce the frequency of directory updates in a directory-based cache system. Embodiments may utilize a read/write (R/W) bit for each block of memory (cache line) to control when processors update a memory directory. As will be described in detail below, when replacing an unmodified block in its local cache, a processor may only update the cache directory when the R/W bit indicates that block has been accessed by multiple processors and written to by at least one processor. Limiting the number of directory updates in this manner may improve performance by preventing unnecessary invalidate requests.

FIG. 1 is a block diagram illustrating an embodiment of a multi-processor system in a Uniform Memory Access (UMA) configuration 100, including at least two processors 102, each having a cache 104 and a cache directory 106, and a system interconnect 108 that couples the processors 102 with a memory 110 and a memory directory 112. The multiprocessor system may also be placed in a Non-Uniform Memory Access (NUMA) configuration, where the system of FIG. 1 is considered a node, and at least two nodes are connected to each other via a system interconnect.

The cache 104 in each processor 102 may store copies of data (cache lines) located in the memory 110. The cache directory 106 may contain entries, which may include tag bits 114, state bits 116, and a read/write (R/W) bit 118 (discussed below), for each cache line stored in the cache 104. The tag bits 114 may be part of the memory address which identify memory blocks (in memory 110) that map to the same cache block. The state bits 116 represent the state in which the cache line is in. For example, in one embodiment, the state of a cache line may be determined by a MESI protocol, where the cache may be represented by one of four states ("M" (Modified), "E" (Exclusive), "S" (Shared) or "I" (Invalid)).

The memory 110 of the system 100 may consist of a plurality of memory blocks (cache lines) 120. The memory directory 112 may contain entries, which can include a dirty bit 122, which represents if cache line is in a Modified state, presence bits 124 (one for each processor in the system), and a R/W bit 126 for each cache line 120 in the memory 110.

The presence bits 124 represent which processor or processors 102 have a copy of the cache line 120 stored in its cache 104. A presence bit 124 can be set anytime a processor 102 associated with the bit reads a cache line 120 from memory 110, for example during a cache miss. The presence bits 124 can be reset whenever the cache line is invalidated by another processor 102. Furthermore, the presence bit 124 can also be reset during a block replacement. In particular, if a block being replaced is either in a Modified state or associated with a region of memory that has been read by at least two processors and written by at least one processor, the presence bit 124 can be reset during a block replacement. The accessibility of the cache line 120 can be determined by the R/W bit 126.

As stated above, The R/W bit 126 represents if a particular cache line 120 has been read by at least two processors and written by at least one processor 102. In one embodiment, the R/W bit 126 may be set by logic internal to the memory directory. For another embodiment, the R/W bit 126 may be set by logic external to the memory directory.

FIG. 2 illustrates a set of operations 200 where the logic sets the R/W in the memory directory. At step 202, for every cache line request received, the logic keeps track of the type of transaction (read or write) and which processor is accessing the cache line. Once it is determined that the cache line has been read by at least two processors, at step 204, and written to by at least one processor, at step 206, the logic sets the R/W bit in the memory directory, at step 208. However, if either of these two conditions is not true, at step 210, the R/W is left unset.

In one embodiment, if a R/W bit is set, it can remain set and may never be reset. For another embodiment, the R/W may be reset based on a threshold value that may be set either dynamically or statically.

As stated earlier, the R/W bit, along with its associated cache line, may be sent to a requesting processor on a cache miss. Subsequently, on a block replacement of an unmodified block, the processor may decide to send a directory update request to the memory directory (to update the presence bits) only if the R/W bit associated with that block is set. Typically, a processor sends an update request every time it replaces a block, regardless if it's modified or not. In cases where the updates are to regions of memory that are generally read-only, it is unnecessary to maintain an accurate record of which processor(s) have a copy of the cache line. As a result, sending directory update requests in these situations causes unnecessary bus traffic. Therefore, by limiting the number of directory updates to regions of memory that have been read to and written to by multiple processors, bus performance can be improved.

Figure 3B:
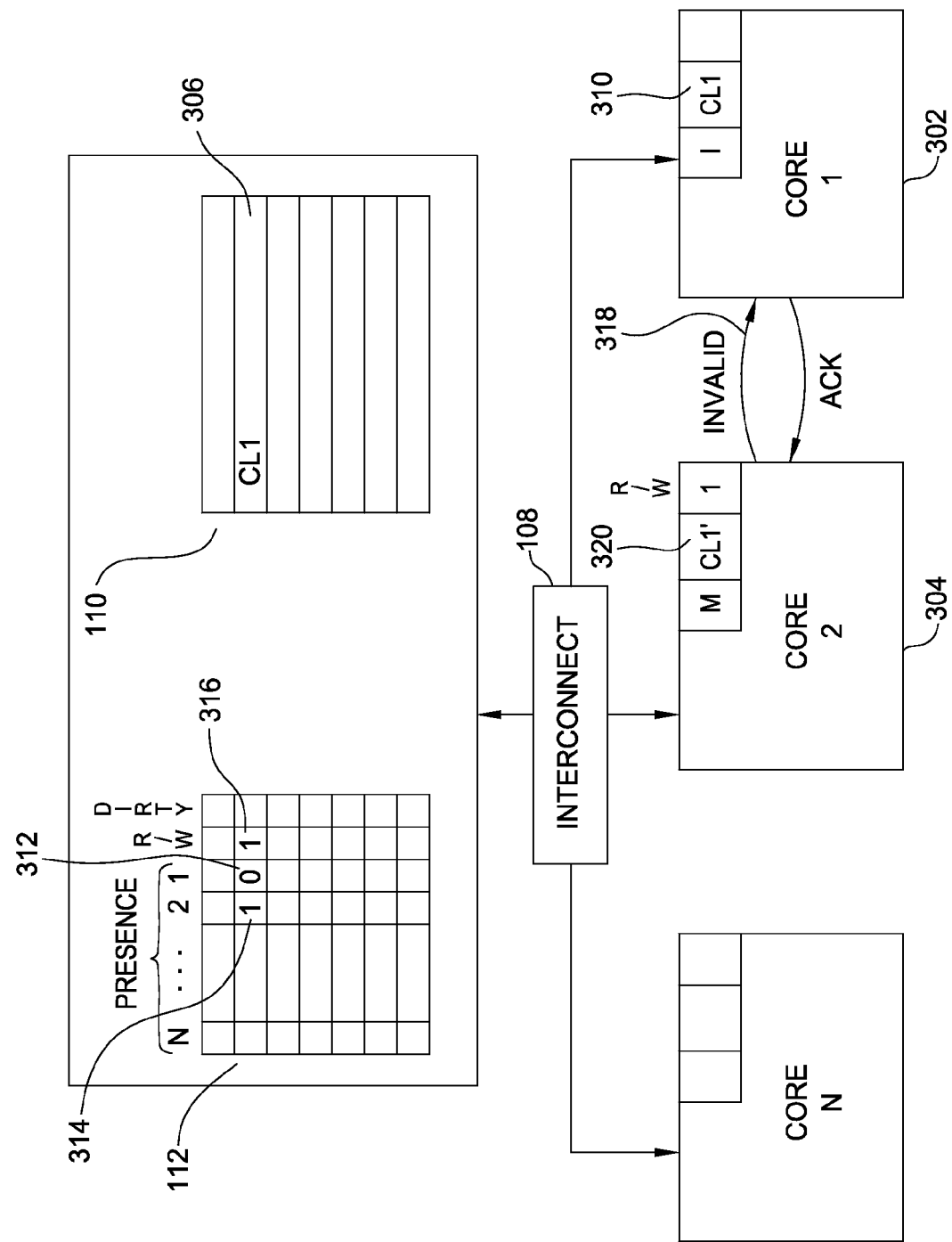

FIGS. 3A and 3B illustrate the system in reference to FIG. 1. In particular, the figures illustrate how the R/W bit is set in the system. FIG. 3A illustrates the situation where Processor 1 (P1) 302 and Processor 2 (P2) 304 have read and stored Cache Line 1 306 in each of their caches 308, 310. As a result, presence bits 1 and 2 (312, 314) for CL1 306 have been set. The R/W bit 316 is set to 0 because a processor has not yet written to CL1 306.

Subsequent to the two reads, as shown in FIG. 3B, P2 304 intends to locally modify CL1 306. Initially, P2 304 can send a request to the memory directory. The directory can then send an invalidate request to P1 302 to invalidate 318 P1's 302 copy of CL1 310. Thereafter, logic in the memory directory 52 can set the R/W bit 316 and ownership of the block can be granted to P2 304 by sending a message to P2. The message also indicates that R/N bit of CL1 in P2 should be set since CL1 306 has been read by more than one processor (the two subsequent reads in FIG. 3A) and has been written by at least one processor. Furthermore, the presence bit for P1 312 is cleared because P2 304 has locally modified CL1' 320 and invalidated the copy in P1 302.

Figure 4:
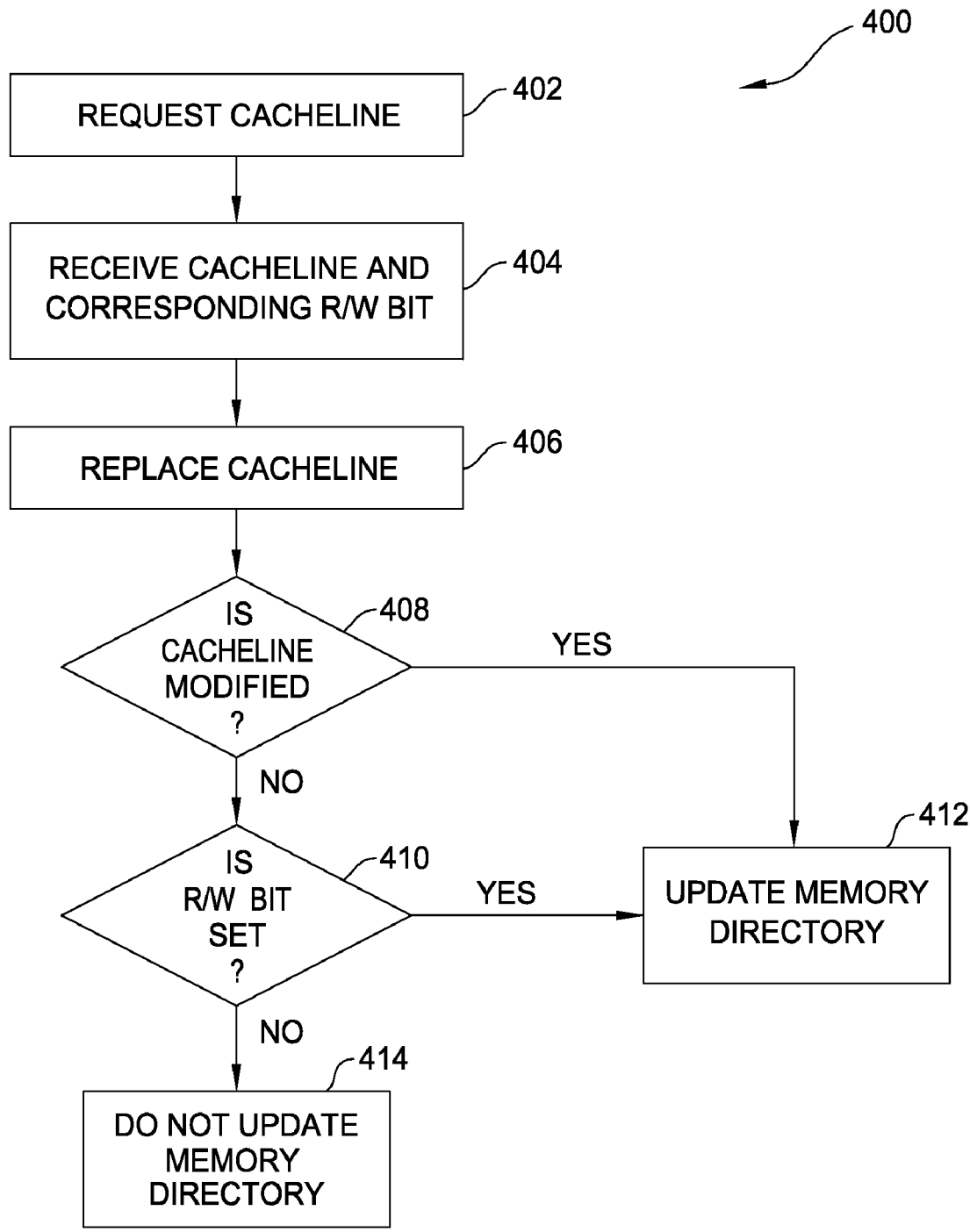
FIG. 4 is a flow diagram of example operations for updating the presence bits in the directory-based cache.

FIG. 4 is a flow diagram of example operations that show how the R/W bit may be used to limit the updating of the cache directory, which may lead to improved performance. The operations begin, for example, when the processor requests data from memory, at step 402. Responding to the request, at step 404, the memory can transfer the data, along with the R/W bit, to the processor. At a later point in time, at step 406, the processor may need to replace the cache line. If so, at step 412, the processor may reset the presence bit if it is determined that the cache line has been modified by the processor, at step 408, or if the R/W bit has been set, at step 410. If the data has not been modified and the R/W has not been set, the processor, at step 414, may not update the memory directory.

Figure 5:
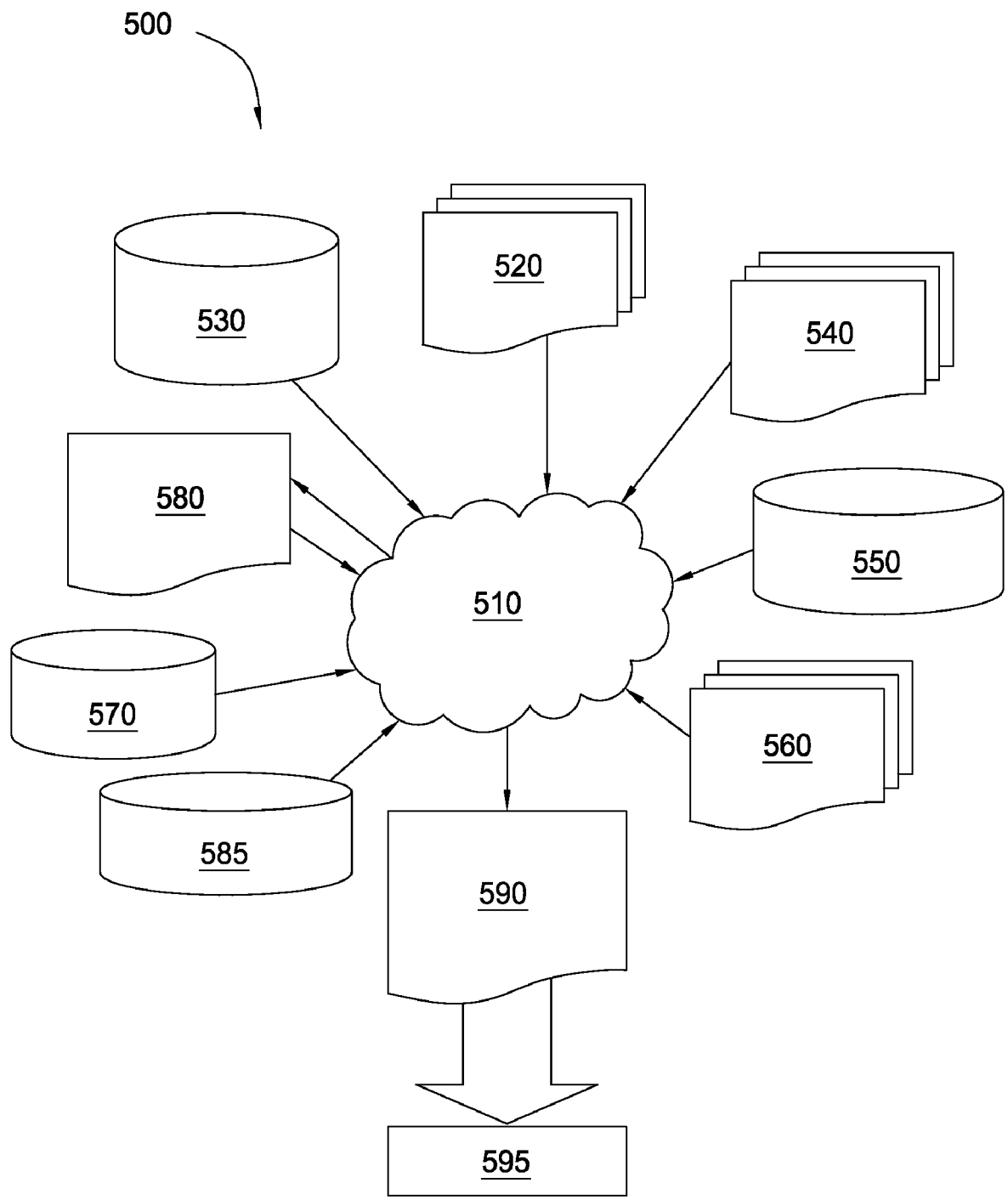
FIG. 5 is a flow diagram of a design process used in semiconductor design, manufacture, and/or test.

FIG. 5 shows a block diagram of an example design flow 500. Design flow 500 may vary depending on the type of IC being designed. For example, a design flow 500 for building an application specific IC (ASIC) may differ from a design flow 500 for designing a standard component. Design structure 520 is preferably an input to a design process 510 and may come from an IP provider, a core developer, or other design company or may be generated by the operator of the design flow, or from other sources. Design structure 520 comprises the circuits described above and shown in FIGS. 1, 3A and 3B in the form of schematics or HDL, a hardware-description language (e.g., Verilog, VHDL, C, etc.). Design structure 520 may be contained on one or more machine readable medium. For example, design structure 520 may be a text file or a graphical representation of a circuit as described above and shown in FIGS. 1, 3A and 3B. Design process 510 preferably synthesizes (or translates) the circuits described above and shown in FIGS. 1, 3A and 3B into a netlist 580, where netlist 580 is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. The medium may also be a packet of data to be sent via the Internet, or other networking suitable means. The synthesis may be an iterative process in which netlist 580 is resynthesized one or more times depending on design specifications and parameters for the circuit.

Design process 510 may include using a variety of inputs; for example, inputs from library elements 530 which may house a set of commonly used elements, circuits, and devices, including models, layouts, and symbolic representations, for a given manufacturing technology (e.g., different technology nodes, 32 nm, 45 nm, 90 nm, etc.), design specifications 540, characterization data 550, verification data 560, design rules 570, and test data files 585 (which may include test patterns and other testing information). Design process 510 may further include, for example, standard circuit design processes such as timing analysis, verification, design rule checking, place and route operations, etc. One of ordinary skill in the art of integrated circuit design can appreciate the extent of possible electronic design automation tools and applications used in design process 510 without deviating from the scope and spirit of the invention. The design structure of the invention is not limited to any specific design flow.

Design process 510 preferably translates a circuit as described above and shown in FIGS. 1, 3A and 3B, along with any additional integrated circuit design or data (if applicable), into a second design structure 590. Design structure 590 resides on a storage medium in a data format used for the exchange of layout data of integrated circuits (e.g. information stored in a GDSII (GDS2), GL1, OASIS, or any other suitable format for storing such design structures). Design structure 590 may comprise information such as, for example, test data files, design content files, manufacturing data, layout parameters, wires, levels of metal, vias, shapes, data for routing through the manufacturing line, and any other data required by a semiconductor manufacturer to produce a circuit as described above and shown in FIGS. 1, 3A and 3B. Design structure 590 may then proceed to a stage 595 where, for example, design structure 590: proceeds to tape-out, is released to manufacturing, is released to a mask house, is sent to another design house, is sent back to the customer, etc.

While the foregoing is directed to embodiments of the present invention, other and further embodiments of the invention may be devised without departing from the basic scope thereof, and the scope thereof is determined by the claims that follow.

The invention claimed is:

1. A design structure embodied in a machine readable storage medium for at least one of designing, manufacturing, and testing a design, which, when processed by a simulation application being executed by operation of one or more computer processors, simulates a system comprising:
   a memory having a plurality of memory blocks;
   a memory directory having a read/write bit associated with each of the plurality of memory blocks and logic configured to set the read/write bit when the memory block associated with the read/write bit has been read by more than one processor and written by at least one other processor and presence bits to indicate processors have or have had a copy of an associated memory block; and
   at least two processors, each having a cache to store a plurality of memory blocks from the memory as cache lines and logic configured to update presence bits in the memory directory when replacing an unmodified cache line corresponding to a memory block only when the associated read/write bit is set.

2. The design structure of claim 1, wherein a value of the read/write bit of a memory block is sent to a processor accessing the memory block.

3. The design structure of claim 1, wherein the at least two processors are within the same chip.

4. The design structure of claim 1, wherein the system is placed in a Uniform Memory Access (UMA) configuration.

5. The design structure of claim 1, the logic that sets the R/W bit is located external to the memory directory.

6. The design structure of claim 1, wherein the design structure comprises a netlist which describes the system.

7. The design structure of claim 1, wherein the design structure resides on the machine readable storage medium as a data format used for the exchange of layout data of integrated circuits.

* * * * *